United States Patent
Iwata et al.

(10) Patent No.: US 12,480,514 B2
(45) Date of Patent: Nov. 25, 2025

(54) TURBO-TYPE FLUID MACHINE AND REFRIGERATION APPARATUS

(71) Applicant: DAIKIN INDUSTRIES, LTD., Osaka (JP)

(72) Inventors: Arihiro Iwata, Osaka (JP); Kosuke Nishimura, Osaka (JP); Koichi Tanaka, Osaka (JP); Daigo Fukuda, Osaka (JP); Yuki Kawachiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 45 days.

(21) Appl. No.: 18/403,038

(22) Filed: Jan. 3, 2024

(65) Prior Publication Data

US 2024/0133393 A1 Apr. 25, 2024
US 2024/0229812 A9 Jul. 11, 2024

Related U.S. Application Data

(63) Continuation of application No. PCT/JP2022/021608, filed on May 26, 2022.

(30) Foreign Application Priority Data

Jul. 5, 2021 (JP) .................................. 2021-111530

(51) Int. Cl.
*F04D 29/66* (2006.01)
*F04D 29/051* (2006.01)
(Continued)

(52) U.S. Cl.
CPC ......... *F04D 29/054* (2013.01); *F04D 29/051* (2013.01); *F04D 29/053* (2013.01);
(Continued)

(58) Field of Classification Search
CPC .... F04D 29/054; F04D 29/051; F04D 29/053; F04D 29/266; F04D 29/28; F04D 29/662
See application file for complete search history.

(56) References Cited

U.S. PATENT DOCUMENTS 11,421,581 B2 * 8/2022 Uneura .................. F04D 29/04
2014/0154114 A1 6/2014 Seok et al.
(Continued)

FOREIGN PATENT DOCUMENTS

CN 212055252 U 12/2020
JP 60-82600 U 6/1985
(Continued)

OTHER PUBLICATIONS

European Search Report of corresponding EP Application No. 22 83 7353.6 dated Oct. 11, 2024.
(Continued)

*Primary Examiner* — Andrew J Marien
(74) *Attorney, Agent, or Firm* — GLOBAL IP COUNSELORS, LLP

(57) ABSTRACT

A turbo-type fluid machine includes a shaft configured to be rotationally driven, a compression mechanism having an impeller, and a coupling portion coupling an end portion of the shaft and the impeller with each other. The coupling portion is provided with a balance adjustment mechanism.

20 Claims, 8 Drawing Sheets

(51) Int. Cl.
  *F04D 29/053*  (2006.01)
  *F04D 29/054*  (2006.01)
  *F04D 29/26*   (2006.01)
  *F04D 29/28*   (2006.01)

(52) U.S. Cl.
  CPC ......... *F04D 29/266* (2013.01); *F04D 29/28* (2013.01); *F04D 29/662* (2013.01)

(56) References Cited

U.S. PATENT DOCUMENTS

| | | | | |
|---|---|---|---|---|
| 2014/0369840 | A1* | 12/2014 | Pinkney | F16D 1/0858 416/204 A |
| 2015/0023785 | A1* | 1/2015 | Stanko | F04D 29/054 415/124.2 |
| 2015/0125306 | A1 | 5/2015 | Schmid et al. | |
| 2015/0226233 | A1* | 8/2015 | Yagi | F04D 29/662 416/144 |
| 2015/0275921 | A1* | 10/2015 | Pinkney | F16D 1/076 416/204 R |
| 2016/0097395 | A1* | 4/2016 | Pruitt | F04D 17/10 29/888.024 |
| 2016/0123342 | A1* | 5/2016 | Harrison | F04D 17/122 416/135 |
| 2018/0180307 | A1* | 6/2018 | Owejan | B32B 3/28 |
| 2024/0295227 | A1* | 9/2024 | Miwata | F04D 19/042 |

FOREIGN PATENT DOCUMENTS

| | | |
|---|---|---|
| JP | 2007-224924 A | 9/2007 |
| JP | 2014-88803 A | 5/2014 |

OTHER PUBLICATIONS

International Preliminary Report of corresponding PCT Application No. PCT/JP2022/021608 dated Jan. 18, 2024.
International Search Report of corresponding PCT Application No. PCT/JP2022/021608 dated Jul. 12, 2022.

* cited by examiner

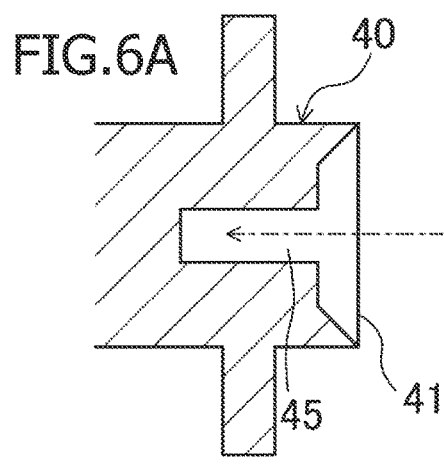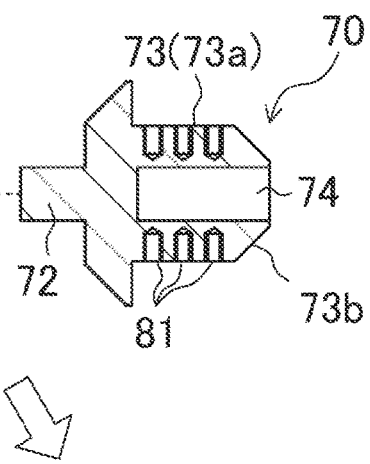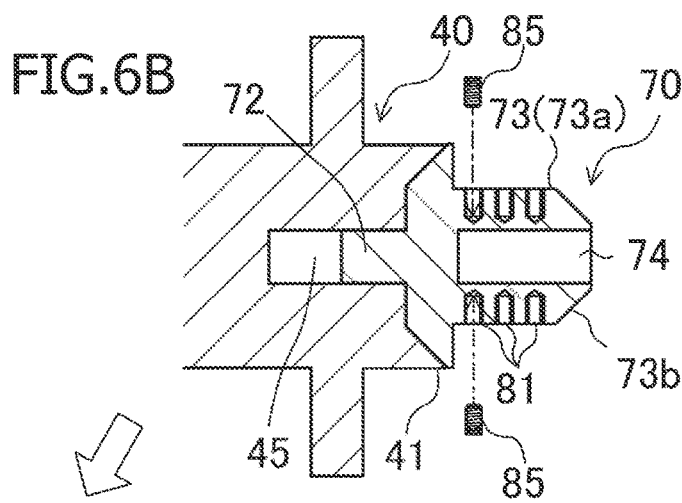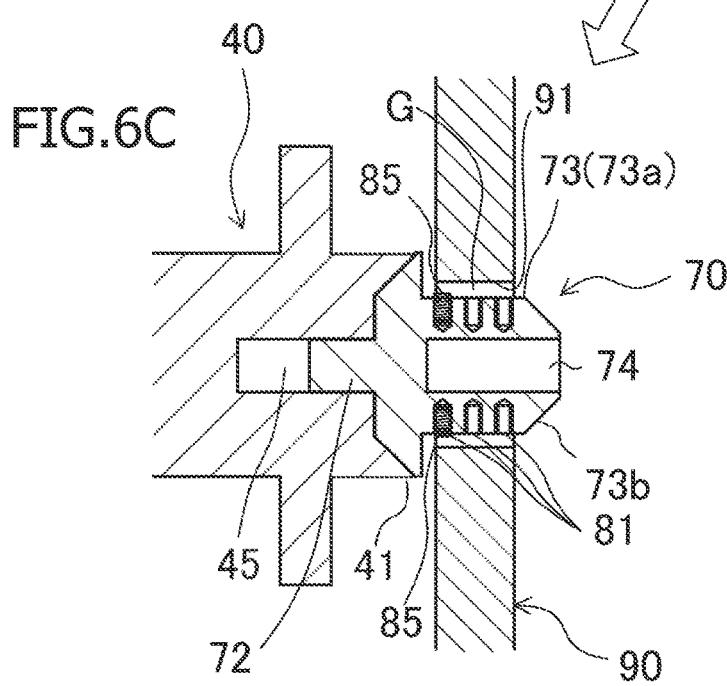

TURBO-TYPE FLUID MACHINE AND REFRIGERATION APPARATUS

CROSS-REFERENCE TO RELATED APPLICATIONS

This is a continuation of International Application No. PCT/JP2022/021608 filed on May 26, 2022, which claims priority to Japanese Patent Application No. 2021-111530, filed on Jul. 5, 2021. The entire disclosures of these applications are incorporated by reference herein.

BACKGROUND

Technical Field

The present disclosure relates to a turbo-type fluid machine and a refrigeration apparatus.

Background Art

Conventionally, a turbo-type fluid machine has been known. Japanese Unexamined Patent Publication No. 2014-88803 discloses a turbo compressor as a turbo-type fluid machine. In the turbo compressor, an attachment hole is formed in a disc portion of an impeller. A weight is attached to the hole, such that the balance of the turbo compressor can be adjusted.

SUMMARY

A first aspect is directed to a turbo-type fluid machine including a shaft configured to be rotationally driven, a compression mechanism having an impeller, and a coupling portion coupling an end portion of the shaft and the impeller with each other. The coupling portion is provided with a balance adjustment mechanism.

BRIEF DESCRIPTION OF THE DRAWINGS

FIG. 6A, FIG. 6B and FIG. 6C are schematic configuration views describing steps of assembling a shaft, the coupling portion, and an impeller.

DETAILED DESCRIPTION OF EMBODIMENT(S)

Embodiments

Embodiments of the present disclosure will be described in detail below with reference to the drawings. The present disclosure is not limited to the embodiments shown below, and various changes can be made within the scope without departing from the technical concept of the present disclosure. Since each of the drawings is intended to illustrate the present disclosure conceptually, dimensions, ratios, or numbers may be exaggerated or simplified as necessary for the sake of ease of understanding.

A turbo-type fluid machine of the present disclosure is applied to a turbo compressor (20). The turbo compressor (20) is provided in a refrigeration apparatus (1).

(1) Overview of Refrigeration Apparatus

Figure 1:
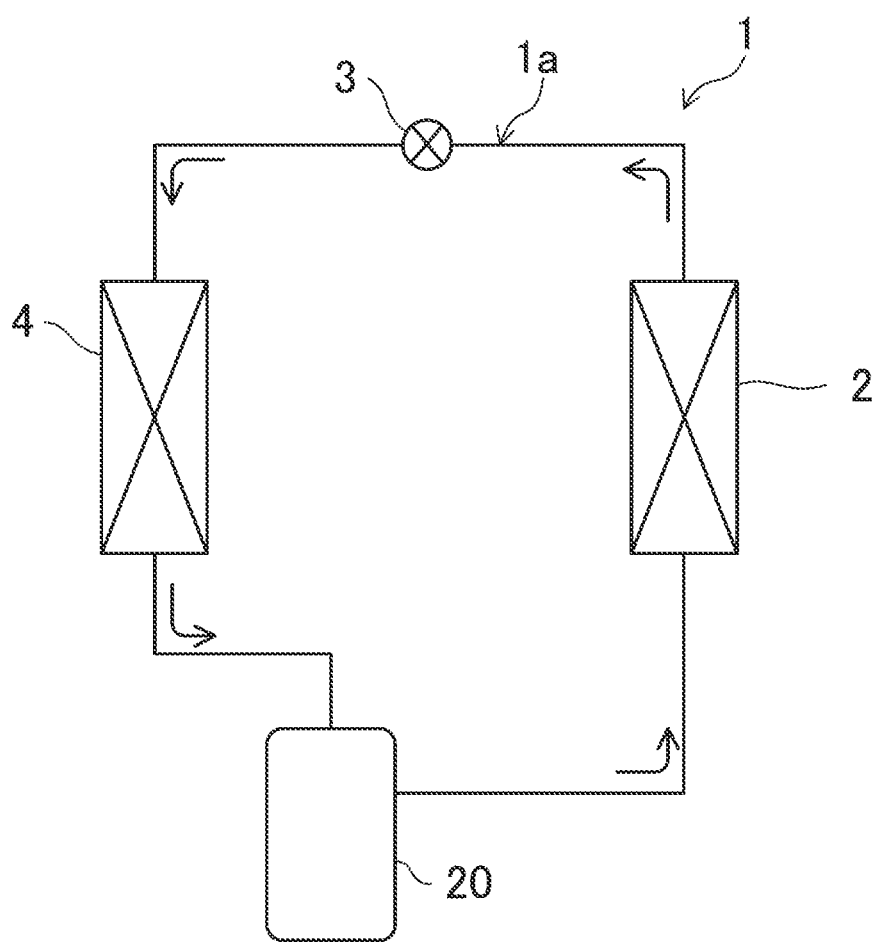
FIG. 1 is a schematic configuration diagram of a refrigeration apparatus provided with a compressor according to an embodiment.

The refrigeration apparatus (1) shown in FIG. 1 includes the turbo compressor (hereinafter also referred to as a compressor (20)) of the present disclosure. The refrigeration apparatus (1) has a refrigerant circuit (1a) filled with refrigerant. The refrigerant circuit (1a) has the compressor (20), a radiator (2), a decompression mechanism (3), and an evaporator (4). The decompression mechanism (3) is an expansion valve. The refrigerant circuit (1a) performs a vapor compression refrigeration cycle.

In the refrigeration cycle, refrigerant compressed by the compressor (20) dissipates heat to air in the radiator (2). The refrigerant having dissipated heat is decompressed by the decompression mechanism (3), and is evaporated in the evaporator (4). The refrigerant having been evaporated is sucked into the compressor (20).

The refrigeration apparatus (1) is an air conditioner. The air conditioner may be any of a cooling apparatus, a heating apparatus, or an air conditioner switchable between cooling and heating. In this case, the air conditioner has a switching mechanism (i.e., four-way switching valve) configured to switch a refrigerant circulation direction. The refrigeration apparatus (1) may be a water heater, a chiller unit, or a cooling apparatus configured to cool air in an internal space. The cooling apparatus cools air inside a refrigerator, a freezer, a container, or the like. The expansion mechanism is an electronic expansion valve, a temperature-sensitive expansion valve, an expander, or a capillary tube.

(2) Compressor

Figure 2:
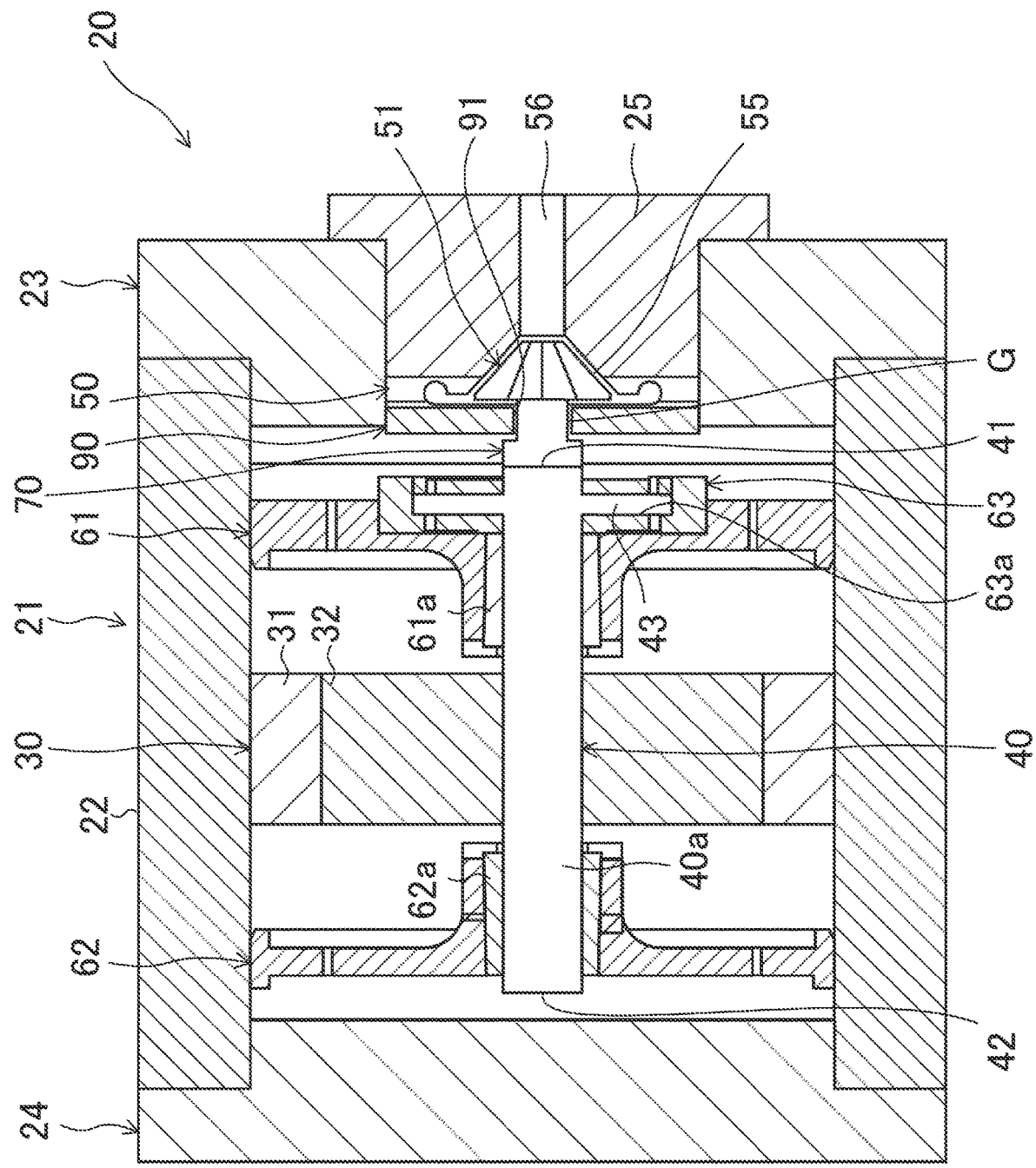
FIG. 2 is a schematic longitudinal sectional view showing an overall configuration of a turbo compressor according to the embodiment.

The overview of the compressor (20) will be described with reference to FIG. 2. FIG. 2 is a longitudinal sectional view of the compressor (20). The compressor (20) of this example is a single-stage compressor having one compression mechanism (50). The compressor (20) has a casing (21), a motor (30), a shaft (40), and the compression mechanism (50). The casing (21) houses the motor (30), the shaft (40), and the compression mechanism (50). The compressor (20) has a bearing member supporting the shaft (40). The bearing member has a first radial bearing member (61), a second radial bearing member (62), and a thrust bearing member (63).

(2-1) Casing

The casing (21) has a barrel (22), a first closing portion (23), and a second closing portion (24). The barrel (22) is formed in the shape of a cylinder having openings on both ends in an axial direction. The first closing portion (23) closes the opening of the barrel (22) on one end in the axial direction. The first closing portion (23) includes a housing (25) positioned at its center. The second closing portion (24) closes the opening of the barrel (22) on the other end in the axial direction.

(2-2) Motor

The motor (30) has a stator (31) and a rotor (32). The stator (31) is formed in a cylindrical shape. The stator (31) is fixed to the inner peripheral surface of the barrel (22) of the casing (21). The rotor (32) is provided inside the stator (31). The operation frequency (number of rotations) of the motor (30) is controlled by an inverter device. In other words, the compressor (20) is an inverter compressor having a variable number of rotations. Thus, the number of rotations of the motor (30) changes between a relatively small number of rotations to a relatively large number of rotations.

(2-3) Shaft

The shaft (40) is fixed to the axis center of the rotor (32). The shaft (40) is rotationally driven by the motor (30). The shaft (40) extends along the axial direction of the casing (21). The shaft (40) has a first end portion (41) and a second end portion (42). The first end portion (41) is an end portion closer to an impeller (51), and the second end portion (42) is an end portion farther from the impeller (51).

The shaft (40) of this example is provided with a thrust plate (43). The thrust plate (43) may be formed integrally with a main body (40a) of the shaft (40), or may be formed as a component separated from the main body (40a) of the shaft (40). The thrust plate (43) of this example is provided near the first end portion (41). The thrust plate (43) is formed in a discoid shape extending radially outward from the main body (40a) of the shaft (40).

(2-4) Radial Bearing Member

The compressor (20) of this example has two radial bearing members (61, 62). The number of radial bearing member (61, 62) and the position of the radial bearing member (61, 62) are merely one example.

The first radial bearing member (61) is arranged closer to the first end portion (41) of the shaft (40). The first radial bearing member (61) is fixed to the barrel (22) of the casing (21). The first radial bearing member (61) has an axis center portion where a cylindrical first radial bearing (61a) is formed. The first radial bearing (61a) rotatably supports the shaft (40).

The second radial bearing member (62) is arranged closer to the second end portion (42) of the shaft (40). The second radial bearing member (62) is fixed to the barrel (22) of the casing (21). The second radial bearing member (62) has an axis center portion where a cylindrical second radial bearing (62a) is formed. The second radial bearing (62a) rotatably supports the shaft (40).

(2-5) Thrust Bearing Member

The thrust bearing member (63) is fixed to a center portion of the first radial bearing member (61). The thrust bearing member (63) is positioned closer to the first end portion (41) of the shaft (40). A thrust bearing (63a) in slide contact with the thrust plate (43) is formed inside the thrust bearing member (63). The thrust bearing (63a) restricts movement of the shaft (40) in the axial direction.

(2-6) Compression Mechanism

Figure 3:
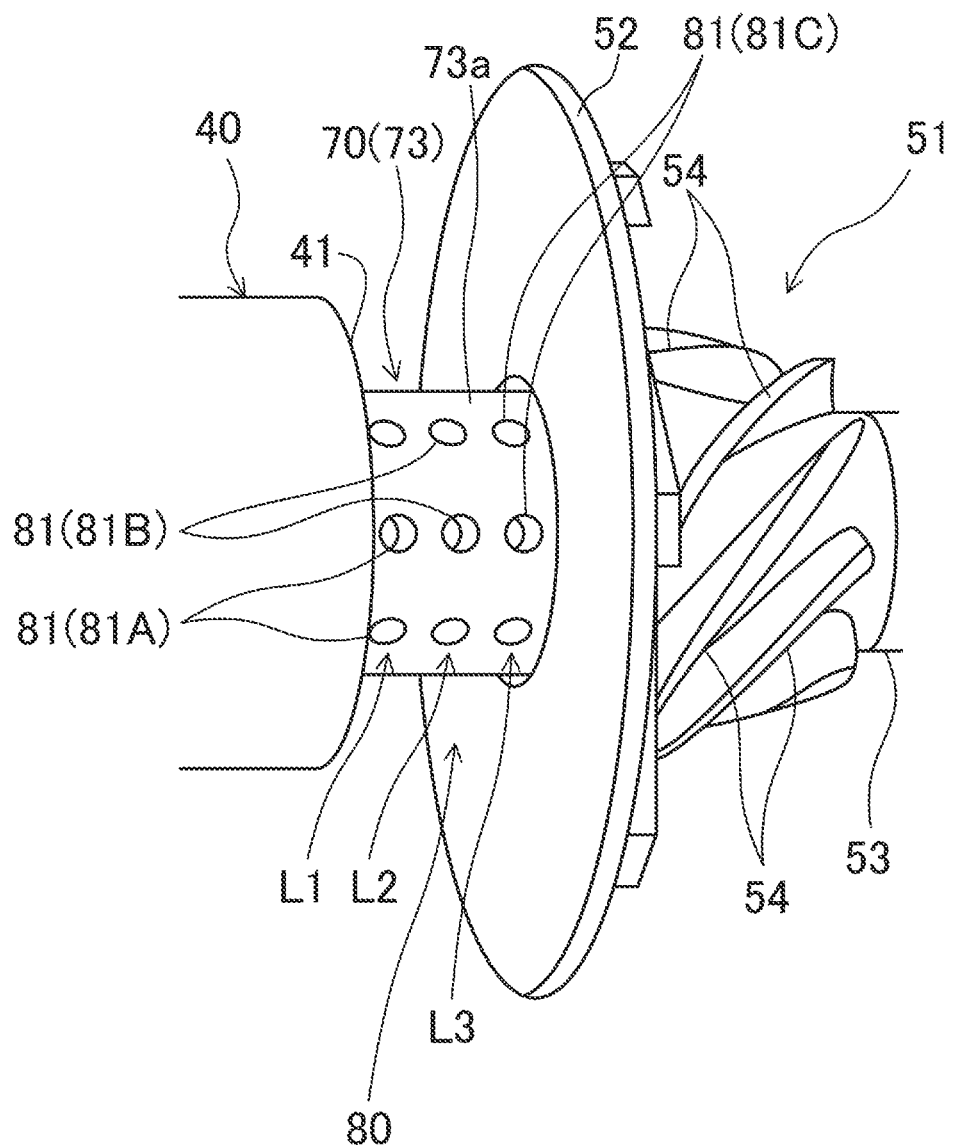
FIG. 3 is an enlarged perspective view of a coupling portion and the periphery thereof.

The compression mechanism (50) is a centrifugal compression mechanism configured to apply kinetic energy to fluid by the centrifugal force of the impeller (51) and convert the kinetic energy into pressure. The compression mechanism (50) includes the housing (25) and the impeller (51). The impeller (51) has a disc portion (52), a shaft portion (53) extending in the axial direction inside a main body of the impeller (51), and a plurality of blades (54) formed along the disc portion (52) and the shaft portion (53) (see FIG. 3). In the compression mechanism (50), a compression chamber (55) is formed between the housing (25) and the impeller (51). The housing (25) has a suction passage (56) for delivering fluid (refrigerant) to the compression chamber (55).

(3) Coupling Portion and Peripheral Structure Thereof

Figure 4:
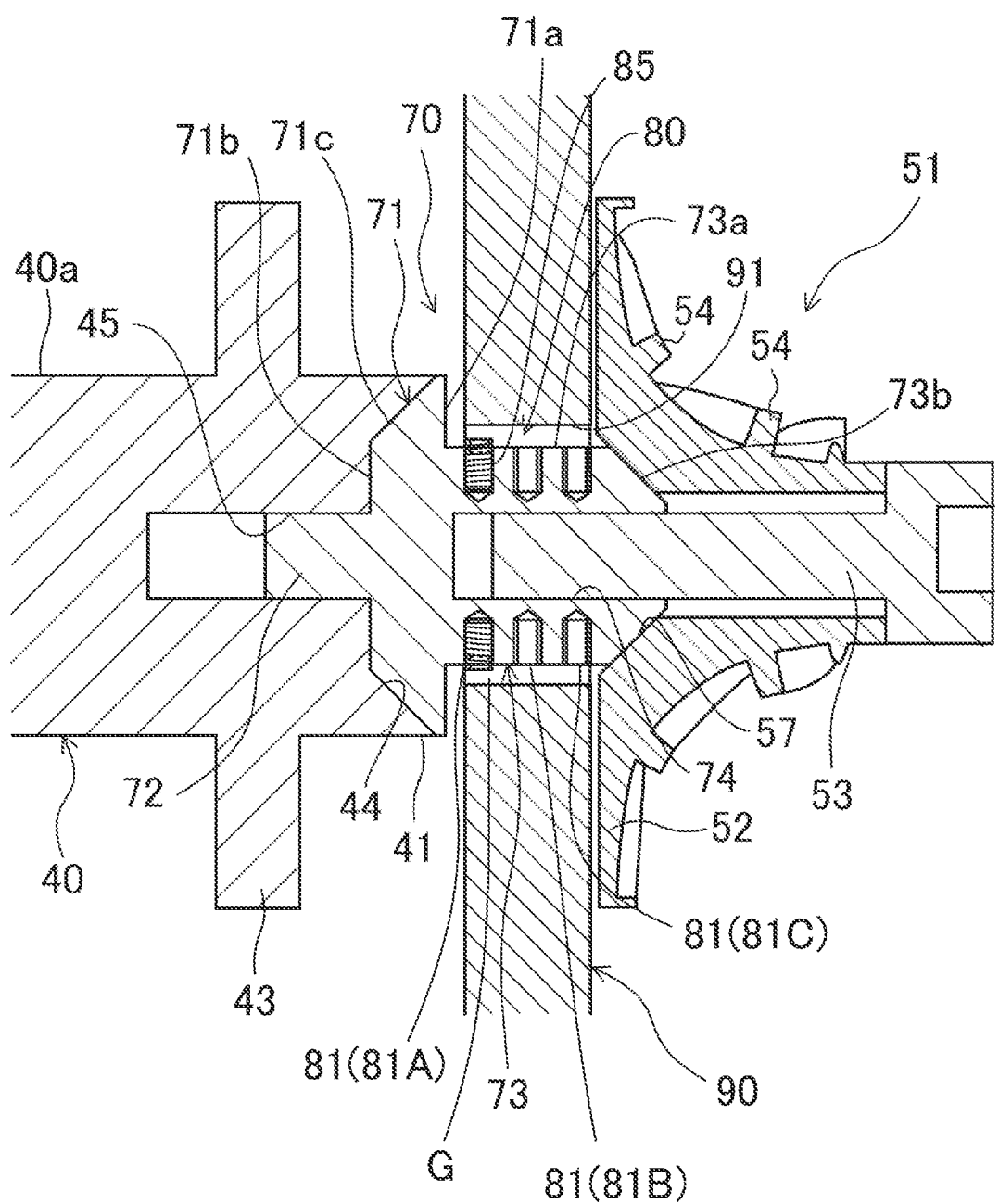
FIG. 4 is an enlarged longitudinal sectional view of the coupling portion and the periphery thereof.
Figure 5:
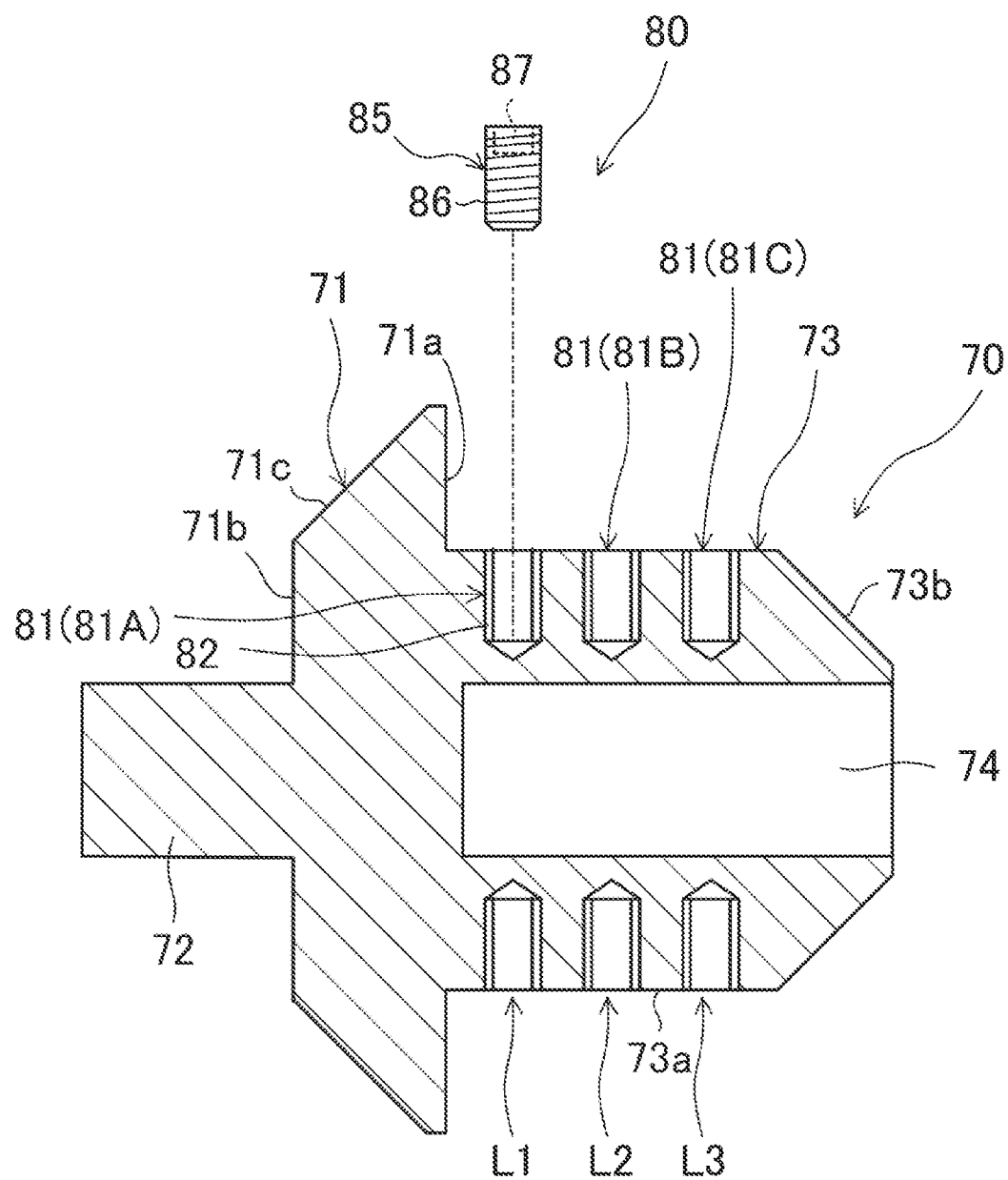
FIG. 5 is an enlarged longitudinal sectional view of the coupling portion and a balance adjustment mechanism.

The compressor (20) has a coupling portion (70). The coupling portion (70) couples the first end portion (41) of the shaft (40) and the impeller (51) (or precisely, the shaft portion (53) of the impeller (51)). The coupling portion (70) and the peripheral structure thereof will be described in detail with reference to FIGS. 3 to 5. The coupling portion (70) has a base portion (71), a protruding portion (72), and a coupling shaft (73).

(3-1) Base Portion

The base portion (71) has a first surface (71a) and a second surface (71b). The first surface (71a) is a surface facing the impeller (51). The second surface (71b) is a surface facing the shaft (40). The base portion (71) has a substantially circular columnar shape. Precisely, the base portion (71) has a truncated conical shape where the diameter of the first surface (71a) is larger than that of the second surface (71b). The base portion (71) has a first tapered portion (71c) having an outer diameter that decreases from the first surface (71a) to the second surface (71b).

The first end portion (41) of the shaft (40) has a first concave portion (44) into which the base portion (71) is fitted. A truncated conical space corresponding to the base portion (71) is formed inside the first concave portion (44).

(3-2) Protruding Portion

The protruding portion (72) protrudes from the second surface (71b) of the base portion (71) toward the shaft (40). The protruding portion (72) has a circular columnar shape. The first end portion (41) of the shaft (40) has a first fitting hole (45) formed continuously to the first concave portion (44). The first fitting hole (45) extends from the bottom of the first concave portion (44) so as to pass through the axis center of the shaft (40). The protruding portion (72) is fitted into the first fitting hole (45). In this example, the length of the first fitting hole (45) in the axial direction is greater than that of the protruding portion (72) in the axial direction.

(3-3) Coupling Shaft

The coupling shaft (73) extends from the first surface (71a) of the base portion (71) toward the impeller (51). The coupling shaft (73) has a cylindrical portion (73a) and a second tapered portion (73b). The cylindrical portion (73a) extends in the axial direction continuously to the base portion (71). The outer diameter of the cylindrical portion (73a) is smaller than that of the shaft (40). The second tapered portion (73b) has an outer diameter that decreases toward the impeller (51).

In the impeller (51), a second concave portion (57) is formed at an axis center portion of the back surface of the disc portion (52). The second tapered portion (73b) is fitted into the second concave portion (57). A truncated conical space corresponding to the second tapered portion (73b) is formed inside the second concave portion (57).

The cylindrical portion (73a) has a third fitting hole (74). The third fitting hole (74) extends in the axial direction from the tip end of the second tapered portion (73b) to the base portion (71). The shaft portion (53) of the impeller (51) is fitted into the third fitting hole (74). The shaft portion (53) penetrates the axis center of the main body of the impeller (51), and protrudes toward the shaft (40) beyond the disc portion (52). The shaft portion (53) is fixed to an end portion of the main body of the impeller (51) closer to the housing (25).

The cylindrical portion (73a) serves as an attachment portion to which a weight component (85) is attached. The cylindrical portion (73a) has a plurality of holes (81), which will be described in detail later.

(3-4) Relationship between Coupling Portion and Peripheral Components Thereof

In the compressor (20) of this example, the shaft (40), the coupling shaft (73), and the impeller (51) are provided as separate components. The shaft (40) is made of an iron material. The coupling portion (70) is made of an aluminum material. The impeller (51) is made of an aluminum material. The density of the shaft (40) is higher than that of the coupling portion (70). The density of the shaft (40) is higher than that of the impeller (51). The density of the coupling portion (70) is substantially equal to that of the impeller (51). The stiffness of the shaft (40) is higher than those of the coupling portion (70) and the impeller (51). In the compressor (20) of this example, the shaft (40) has an enhanced stiffness, and the coupling portion (70) and the impeller (51) has a reduced weight.

(4) Balance Adjustment Mechanism

The compressor (20) includes a balance adjustment mechanism (80). The balance adjustment mechanism (80) adjusts weight balance during operation of the compressor (20). The balance adjustment mechanism (80) of this example includes the plurality of holes (81) and the weight component (85) attached to any of the plurality of holes (81).

(4-1) Hole

The plurality of holes (81) are formed in the coupling portion (70). Specifically, the plurality of holes (81) are formed in the outer peripheral surface of the cylindrical portion (73a). The plurality of holes (81) are positioned so as to be exposed to a space inside the casing (21). The holes (81) each have an inner peripheral surface having an internal thread portion (82). In other words, the weight component (85) having an external thread portion (86) is fastened to the hole (81).

The plurality of holes (81) of this example includes a plurality of (e.g., ten) first holes (81A), a plurality of (e.g., ten) second holes (81B), and a plurality of (e.g., ten) third holes (81C). The plurality of first holes (81A) are arranged in a circumferential direction in the outer peripheral surface of the cylindrical portion (73a). The plurality of first holes (81A) are arranged at equal intervals. The plurality of second holes (81B) are arranged in the circumferential direction in the outer peripheral surface of the cylindrical portion (73a). The plurality of second holes (81B) are arranged at equal intervals. The plurality of third holes (81C) are arranged in the circumferential direction in the outer peripheral surface of the cylindrical portion (73a). The plurality of third holes (81C) are arranged at equal intervals.

The plurality of first holes (81A) constitute a first line group (L1). The plurality of second holes (81B) constitute a second line group (L2). The plurality of third holes (81C) constitute a third line group (L3). In the coupling portion (70) (or precisely, the cylindrical portion (73a)), the first line group (L1), the second line group (L2), and the third line group (L3) are arranged in the axial direction. The first line group (L1) is positioned closer to the shaft (40), the third line group (L3) is positioned closer to the impeller (51), and the second line group (L2) is positioned between the first line group (L1) and the third line group (L3).

The number of first holes (81A) of the first line group (L1) and the number of second holes (81B) of the second line group (L2) are the same in one preferred embodiment. The first hole (81A) of the first line group (L1) and the second hole (81B) of the second line group (L2) overlap with each other when viewed in the axial direction in one preferred embodiment. The first hole (81A) of the first line group (L1) and the second hole (81B) of the second line group (L2) have the same structure in one preferred embodiment.

The number of second holes (81B) of the second line group (L2) and the number of third holes (81C) of the third line group (L3) are the same in one preferred embodiment. The second hole (81B) of the second line group (L2) and the third hole (81C) of the third line group (L3) overlap with each other when viewed in the axial direction in one preferred embodiment. The second hole (81B) of the second line group (L2) and the third hole (81C) of the third line group (L3) have the same structure in one preferred embodiment.

(4-2) Weight Component

The weight component (85) of this example is a weight having the external thread portion (86). The weight component (85) is a so-called "set screw." The weight component (85) includes a head portion having a square hole (87) into which a tool such as a hexagonal wrench is fitted. After inserting the weight component (85) into a predetermined hole (81), a worker inserts the tool into the hole (81) and rotates the weight component (85). In this manner, the external thread portion (86) of the weight component (85) is fastened to the internal thread portion (82) of the hole (81), and the weight component (85) is attached to the hole (81).

(5) Plate Member

A plate member (90) serving as a seal member is provided near the compression mechanism (50). The plate member (90) forms a first member (90) of the present disclosure. The plate member (90) of this example is formed in an annular shape having a through-hole (91) in the axial direction. The plate member (90) is supported on the first closing portion (23) so as to face the back surface of the disc portion (52) of the impeller (51).

The coupling portion (70) penetrates the through-hole (91) of the plate member (90). Specifically, the cylindrical portion (73a) of the coupling portion (70) passes through the through-hole (91). In other words, the cylindrical portion (73a) forms a portion of the coupling portion (70) surrounded by the first member (90). A gap (G) is formed between the plate member (90) and the cylindrical portion (73a). The gap (G) is formed in a cylindrical shape. In the gap (G), fluid is stirred with rotation of the coupling portion (70). Accordingly, a seal portion is formed by the fluid flow in the gap (G). As a result, leakage of fluid in the compression chamber (55) into a space on the motor (30) side through the gap (G) can be reduced.

(6) Operation of Compressor

When the compressor (20) is in operation, the motor (30) is energized. Accordingly, the shaft (40) rotates. When the shaft (40) rotates, the impeller (51) coupled to the shaft (40) rotates. When the impeller (51) rotates, refrigerant flows into the compression chamber (55) through the suction passage (56). In the compression chamber (55), the refrigerant is delivered radially outward by the plurality of blades (54), and the flow velocity of the refrigerant increases accordingly. As the velocity of the refrigerant decreases, the pressure of the refrigerant increases. The refrigerant compressed in this manner is delivered to the outside of the casing (21) through a discharge passage (not shown). The refrigerant discharged from the compressor (20) is used for the refrigeration cycle of the refrigeration apparatus (1).

(7) Balance Adjustment at Assembly

When the compressor (20) is assembled, the worker adjusts the balance of the weight of the compressor (20). A method for assembling the compressor (20) will be described in detail with reference to FIG. 6A, FIG. 6B, FIG. 6C, FIG. 7A and FIG. 7B.

In a first step shown in FIG. 6A, the worker attaches the coupling portion (70) to the first end portion (41) of the shaft (40). Specifically, the worker fits the protruding portion (72) of the coupling portion (70) into the first fitting hole (45) of the first end portion (41). As a method for fixing the coupling portion (70) and the first end portion (41) of the shaft (40) to each other, press-fitting, shrink-fitting, welding, bonding, or the like can be employed.

Next, in a second step shown in FIG. 6B, the worker adjusts the balance of a unit of the shaft (40) and the coupling portion (70) fixed to each other. Specifically, the worker attaches the weight component (85) to a predetermined one of the plurality of holes (81) in the coupling portion (70). In this manner, the substantial weight of the shaft (40) in the circumferential direction or the axial direction can be adjusted.

Next, in a third step shown in FIG. 6C, the worker inserts the cylindrical portion (73a) of the coupling portion (70) into the through-hole (91) of the plate member (90). In this state, the second tapered portion (73b) of the coupling portion (70) protrudes to the tip end side beyond the plate member (90). Since the coupling portion (70) and the impeller (51) are separate members, the plate member (90) can be positioned around the coupling portion (70) without dividing the plate member (90). While the cylindrical portion (73a) is inserted into the through-hole (91), the weight component (85) is positioned so as not to interfere with the inner peripheral surface of the through-hole (91).

Figure 7A:
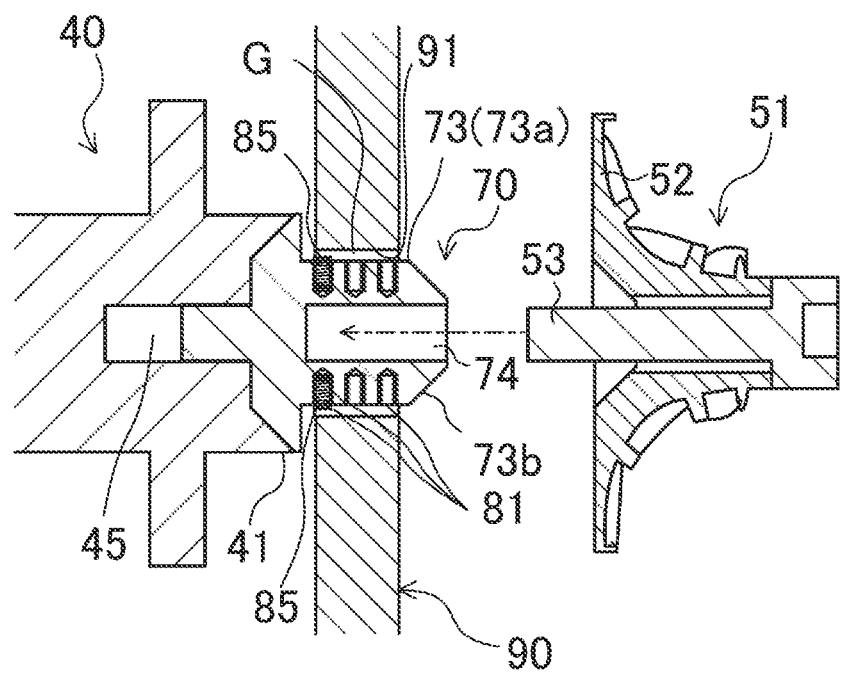
FIG. 7A and FIG. 7B are schematic configuration views describing the steps of assembling the shaft, the coupling portion, and the impeller.

Next, in a fourth step shown in FIG. 7A, the worker attaches the impeller (51) to the coupling portion (70). The impeller (51) is a separate component from the shaft (40) and the coupling portion (70). Thus, the balance of the impeller (51) can be adjusted separately. The balance of the impeller (51) is adjusted by the worker at predetermined timing before the fourth step. In the fourth step, the worker fits the shaft portion (53) of the impeller (51) into the third fitting hole (74) of the cylindrical portion (73a). As a method for fixing the coupling portion (70) and the impeller (51) to each other, press-fitting, shrink-fitting, welding, bonding, or the like can be employed.

Figure 7B:
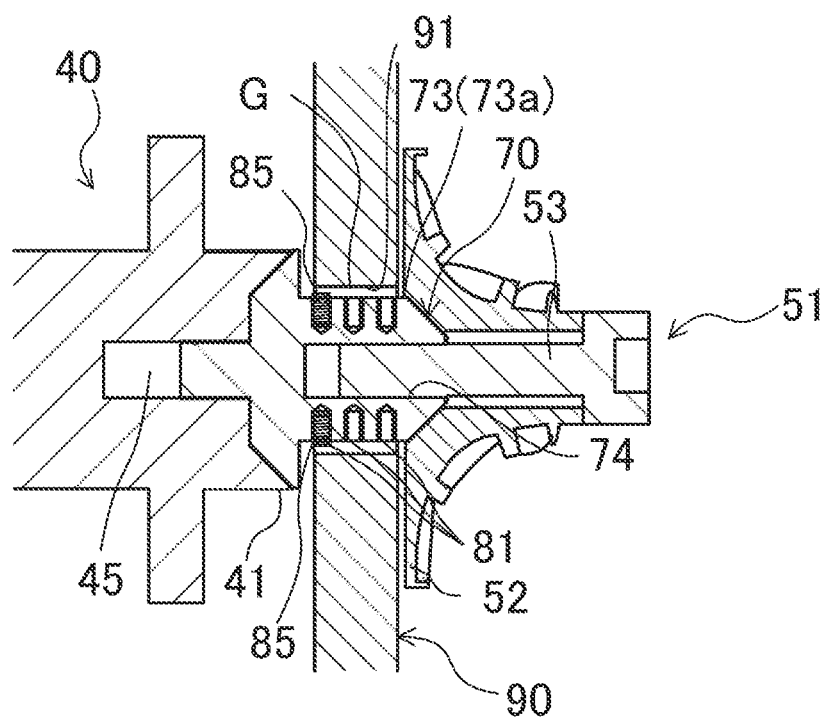

Through the above steps, as shown in FIG. 7B, a unit of the shaft (40) and the impeller (51) coupled with each other through the coupling portion (70) is assembled. In this unit, the balance is accurately adjusted by the above steps.

(8) Features (8-1)

The balance adjustment mechanism (80) is provided at the coupling portion (70) coupling the first end portion (41) of the shaft (40) and the impeller (51) with each other. If a weight for balance adjustment is attached to the impeller (51), the weight of the impeller (51) increases due to, e.g., an increase in the thickness of the disc portion (52) of the impeller (51). Since the impeller (51) is positioned farthest from the shaft (40), an increase in the weight of the impeller (51) leads to an increase in a bending moment acting on the shaft (40), thereby making the shaft (40) bend more easily. As a result, the shaft (40) cannot be rotated at a high speed, and thus the maximum number of rotations of the compressor (20) is decreased and the operation range of the compressor (20) is narrowed.

On the other hand, in this configuration, the balance adjustment mechanism (80) is provided at the coupling portion (70), and thus an increase in the weight of the impeller (51) can be reduced. As a result, an increase in the bending moment acting on the shaft (40) can be reduced, and bending of the shaft (40) can be reduced. Thus, the shaft (40) can be rotated at a high speed, and the operation range of the compressor (20) can be expanded.

(8-2)

The shaft (40), the coupling portion (70), and the impeller (51) are separate components. Thus, the balance of the unit of the shaft (40) and the coupling portion (70) assembled together can be adjusted individually. The balance of the impeller (51) can be adjusted separately while being separated from the shaft (40) and the coupling portion (70). As a result, in the unit of the shaft (40), the coupling portion (70), and the impeller (51) assembled together, the balance can be adjusted accurately in the end.

Since the coupling portion (70) and the impeller (51) are separate components, the impeller (51) can be attached to the coupling portion (70) after the coupling portion (70) is inserted into the through-hole (91) of the plate member (90). Thus, the plate member (90) can be positioned around the coupling portion (70) without dividing the plate member (90). Consequently, the structure of the plate member (90) can be simplified.

(8-3)

The density of the coupling portion (70) is less than that of the shaft (40). Thus, the coupling portion (70) can be reduced in weight, and an increase in the bending moment acting on the shaft (40) due to the coupling portion (70) can be reduced. Consequently, bending of the shaft (40) can be reduced, and the shaft (40) can be rotated at a high speed.

(8-4)

The density of the impeller (51) is less than that of the shaft (40). Thus, the impeller (51) can be further reduced in weight, and an increase in the bending moment acting on the shaft (40) due to the impeller (51) can be reduced.

(8-5)

The balance adjustment mechanism (80) includes the plurality of holes (81) formed in the coupling portion (70) and the weight component (85) attached to a predetermined one of the plurality of holes (81). The weight component (85) is attached to the predetermined one of the plurality of holes (81), such that the balance can be easily adjusted.

(8-6)

In the coupling portion (70), the plurality of holes (81) are arranged in the circumferential direction of the coupling portion (70). Thus, the substantial weight distribution in the circumferential direction of the shaft (40) can be easily adjusted.

(8-7)

In the coupling portion (70), the line groups (L1, L2, L3), each including the plurality of holes, are arranged in the axial direction of the shaft (40). Thus, the substantial weight distribution in the axial direction of the shaft (40) can be easily adjusted.

(8-8)

The plate member (90) is provided as the first member arranged with the outer peripheral surface of the coupling portion (70) via the gap (G). In the gap (G) between the plate member (90) and the coupling portion (70), fluid is stirred with rotation of the coupling portion (70). Accordingly, the seal portion can be formed by the fluid flow in the gap (G). As a result, leakage of fluid compressed in the compression chamber (55) into the space on the motor (30) side can be reduced.

In particular, the weight component (85) is attached to the outer peripheral surface of the cylindrical portion (73a) of the coupling portion (70). Thus, when the coupling portion (70) rotates, the weight component (85) can promote fluid stirring. As a result, the sealing performance of the seal portion in the gap (G) can be improved.

(8-9)

The outer diameter of the portion (i.e., cylindrical portion (73a)) of the coupling portion (70) surrounded by the plate member (90) is smaller than that of the shaft (40). Thus, the area of the gap between the cylindrical portion (73a) and the plate member (90) can be decreased, and thus leakage of fluid compressed in the compression chamber (55) into the space on the motor (30) side can be reduced.

(9) Variations

The above embodiment may be modified as the following variations. In the following description, differences from the embodiment will be described in principle.

(9-1) First Variation: Configuration of Coupling Portion

Figure 8:
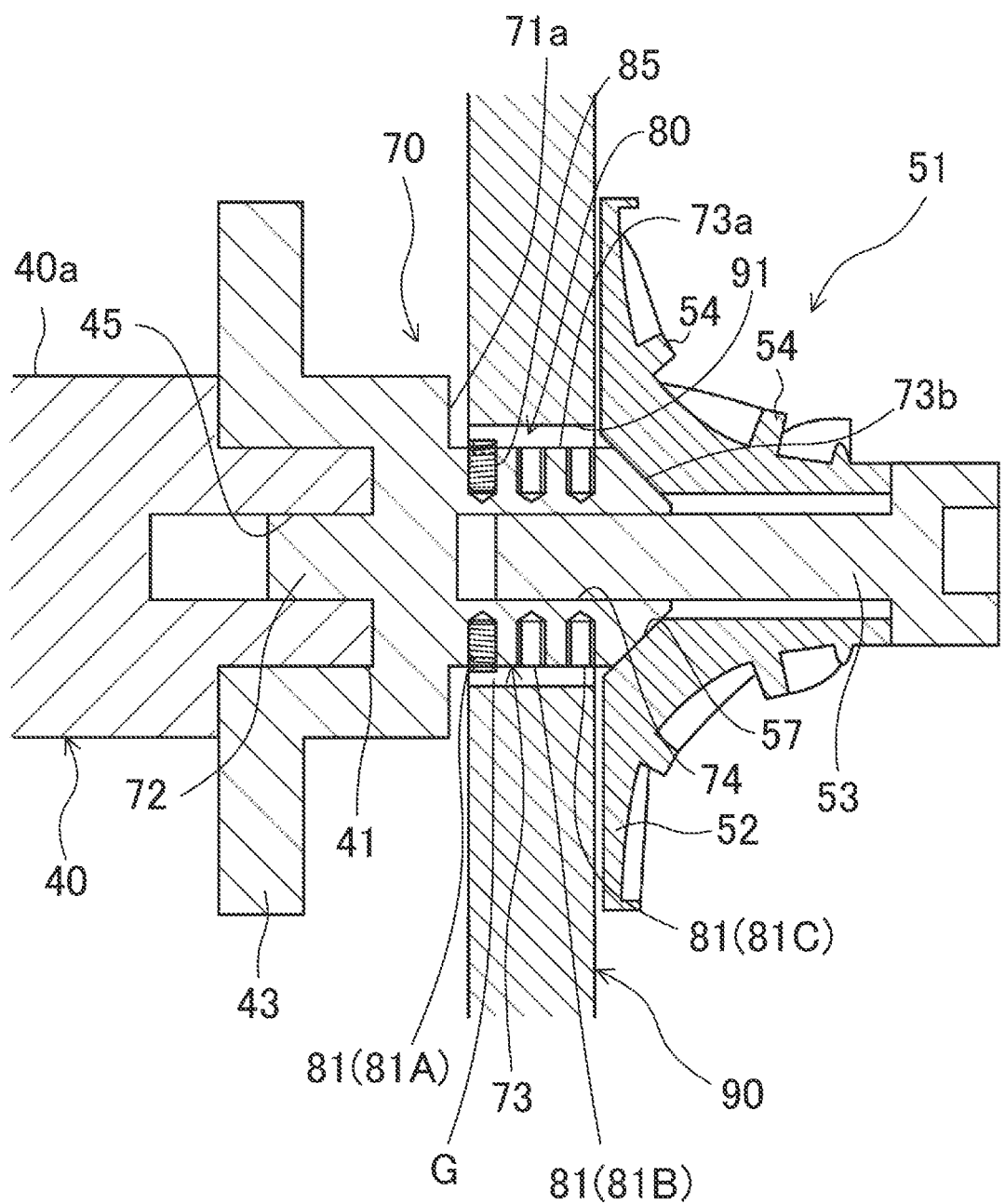
FIG. 8 corresponds to FIG. 4 and shows a compressor according to a first variation.

As shown in FIG. 8, the thrust plate (43) may be formed integrally with the coupling portion (70). In this case, the thrust plate (43) can be reduced in weight. The coupling portion (70) and the impeller (51) may be formed as a single component that is a separate component from the shaft (40). In this case, the density of the unit including the coupling portion (70) and the impeller (51) is smaller than that of the shaft (40) in one preferred embodiment. The shaft (40), the coupling portion (70), and the impeller (51) may be an integrated component.

(9-2) Second Variation: Balance Adjustment Mechanism

The weight component (85) may be fixed to the coupling portion (70) by a fixing method other than fastening (e.g., press-fitting, shrink-fitting, welding, or bonding). The plurality of holes (81) may be arranged in only one line in the axial direction. The plurality of holes (81) are not necessarily arranged in the circumferential direction.

(9-3) Third Variation: Other Application Examples

The configuration of the coupling portion (70) of the present disclosure may be applied to a two-stage turbo compressor (20) having two compression mechanisms (50). The configuration of the coupling portion of the present disclosure may be employed in a turbo-type fluid machine other than the turbo compressor (20). Specifically, this configuration may be employed in a turbocharger provided in a vehicle and the like.

While the embodiment and variations thereof have been described above, it will be understood that various changes in form and details may be made without departing from the spirit and scope of the claims. The embodiments, the variation thereof, and the other embodiments may be combined and replaced with each other without deteriorating intended functions of the present disclosure.

The ordinal numbers such as "first," "second," and "third" described above are used to distinguish the terms to which these expressions are given, and do not limit the number and order of the terms.

As described above, the present disclosure is useful for a turbo-type fluid machine and a refrigeration apparatus.

The invention claimed is:

1. A turbo-type fluid machine comprising:
a shaft configured to be rotationally driven;
a compression mechanism having an impeller; and
a coupling portion coupling an end portion of the shaft and the impeller with each other,
the coupling portion being provided with a balance adjustment mechanism,
the end portion of the shaft being connected to one end of the coupling portion in an axial direction of the shaft, and
the compression mechanism being connected to an other end of the coupling portion in the axial direction.

2. The turbo-type fluid machine of claim 1, wherein the shaft, the coupling portion, and the impeller are separate components.

3. The turbo-type fluid machine of claim 2, wherein the balance adjustment mechanism includes
a plurality of holes formed in the coupling portion, and
a weight component attached to a predetermined one of the plurality of holes.

4. The turbo-type fluid machine of claim 2, further comprising:
a first member arranged around an outer peripheral surface of the coupling portion to form a gap therebetween.

5. A refrigeration apparatus including the turbo-type fluid machine according to claim 2.

6. The turbo-type fluid machine of claim 1, wherein the balance adjustment mechanism includes
a plurality of holes formed in the coupling portion, and
a weight component attached to a predetermined one of the plurality of holes.

7. The turbo-type fhud machine of claim 6, wherein
in the coupling portion, the plurality of holes are arranged in a circumferential direction of the coupling portion.

8. The turbo-type fluid machine of claim 7, further comprising:
a first member arranged around an outer peripheral surface of the coupling portion to form a gap therebetween.

9. A refrigeration apparatus including the turbo-type fluid machine according to claim 7.

10. The turbo-type fluid machine of claim 6, further comprising:
a first member arranged around an outer peripheral surface of the coupling portion to form a gap therebetween.

11. A refrigeration apparatus including the turbo-type fluid machine according to claim 6.

12. The turbo-type fluid machine of claim 1, further comprising:
a first member arranged around an outer peripheral surface of the coupling portion to form a gap therebetween.

13. A refrigeration apparatus including the turbo-type fluid machine according to claim 1.

14. A turbo-type fluid machine comprising:
a shaft configured to be rotationally driven;
a compression mechanism having an impeller; and
a coupling portion coupling an end portion of the shaft and the impeller with each other,
the coupling portion being provided with a balance adjustment mechanism,
the shaft, the coupling portion, and the impeller being separate components, and a density of the coupling portion being less than a density of the shaft.

15. The turbo-type fluid machine of claim 14, wherein the balance adjustment mechanism includes
a plurality of holes formed in the coupling portion, and
a weight component attached to a predetermined one of the plurality of holes.

16. The turbo-type fluid machine of claim 14, further comprising:
a first member arranged around an outer peripheral surface of the coupling portion to form a gap therebetween.

17. A refrigeration apparatus including the turbo-type fluid machine according to claim 14.

18. A turbo-type fluid machine comprising:
a shaft configured to be rotationally driven
a compression mechanism ng an impeller; and
a coupling portion coupling an end portion of the shaft and the impeller with each other,
the coupling portion being provided with a balance adjustment mechanism, the balance adjustment mechanism including
a plurality of holes formed in the coupling portion, and a weight component attached to a predetermined one of the plurality of holes, in the coupling portion, the plurality of holes being arranged in a circumferential direction of the coupling portion, the coupling portion, having a first line group and a second line group, each of the first line group and the second line group including the plurality of holes arranged in the circumferential direction of the coupling portion, and the first line group and the second line group being arranged in an axial direction of the coupling portion.

19. The turbo-type fluid machine of claim 18, further comprising:

a first member arranged around an outer peripheral surface of the coupling portion to form a gap therebetween.

20. A turbo-type fluid machine comprising:

a shaft configured to be rotation lly driven;

a compression mechanism having an impeller;

a coupling portion coupling an end portion of the shaft and the impeller with each other; and a first member arranged around an outer peripheral surface of the coupling portion to form a gap therebetween, the coupling portion being provided with a balance adjustment mechanism, and an outer diameter of a portion of the coupling portion surrounded by the first member being smaller than an outer diameter of the shaft.

* * * * *